Feb. 9, 1932.  F. D. CHAPMAN  1,844,346
MIXTURE CONDITIONING DEVICE
Filed March 24, 1930   3 Sheets-Sheet 1
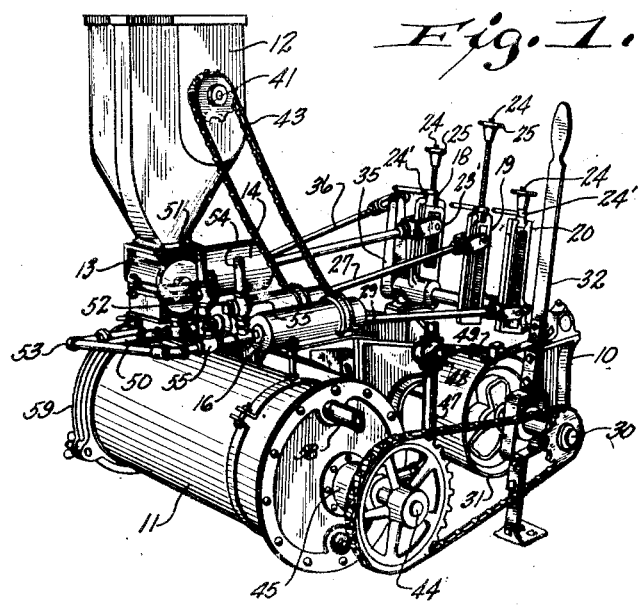
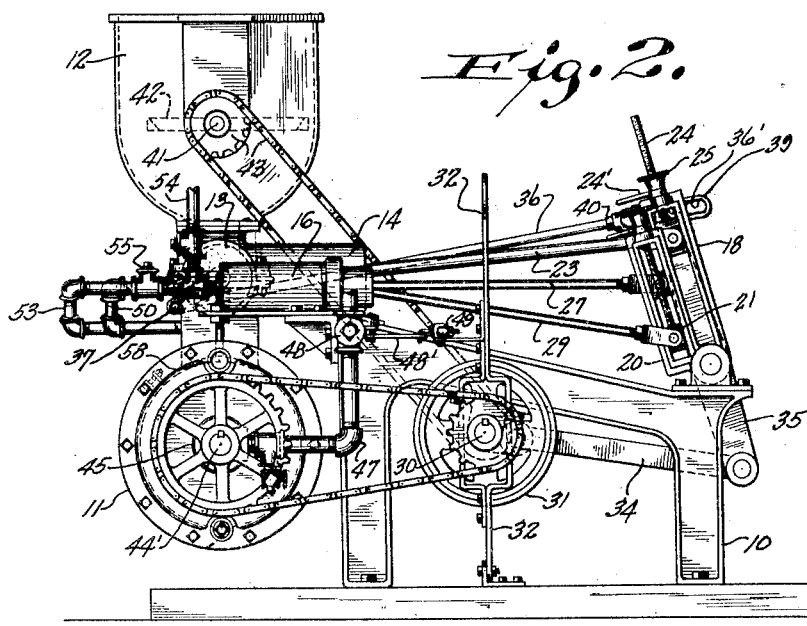
INVENTOR.
Frank D. Chapman
BY Morsell, Keeney & Morsell
ATTORNEYS.

Feb. 9, 1932.　　　F. D. CHAPMAN　　　1,844,346
MIXTURE CONDITIONING DEVICE
Filed March 24, 1930　　　3 Sheets-Sheet 2

INVENTOR.
Frank D. Chapman
BY
Morsell, Keeney & Morsell
ATTORNEYS.

Feb. 9, 1932. F. D. CHAPMAN 1,844,346
MIXTURE CONDITIONING DEVICE
Filed March 24, 1930  3 Sheets-Sheet 3

INVENTOR.
Frank D. Chapman.
BY Morsell, Keeney & Morsell
ATTORNEYS.

Patented Feb. 9, 1932

1,844,346

UNITED STATES PATENT OFFICE

FRANK D. CHAPMAN, OF BERLIN, WISCONSIN

MIXTURE CONDITIONING DEVICE

Application filed March 24, 1930. Serial No. 438,546.

This invention relates to improvements in mixture conditioning devices more particularly, although not solely, adapted for treating corn removed from the ears preparatory to canning the same.

It is one of the objects of the present invention to provide a proportional heater which will supply a batch of corn with a predetermined proportional amount of sugar and brine and then mix the batch while subjecting it to heat to bring the mass to the desired consistency.

A further object of the invention is to provide a proportional heater in which the parts are independently adjustable to vary the amount of sugar and salt, or sugar, or salt and water and corn or vegetables.

A further object of the invention is to provide a proportional heater in which a revolving means is used for mixing the brine and sugar into the corn and also for steaming the same to produce a constant consistency in all of the batches.

A further object of the invention is to provide a proportional heater in which the same amount of heat and the same amount of condensed water from the steam supplying the heat is supplied to maintain the product at a constant consistency.

A further object of the invention is to provide a proportional heater which is of simple construction, is strong and durable and is well adapted for the purpose described.

With the above and other objects in view the invention consists of the improved proportional heater and its parts and combinations as set forth in the claims and all equivalents thereof.

In the accompanying drawings in which the same reference characters indicate the same parts in all of the views:

Fig. 1 is a perspective view of the improved proportional heater;

Fig. 2 is a side view thereof;

Figure 3:
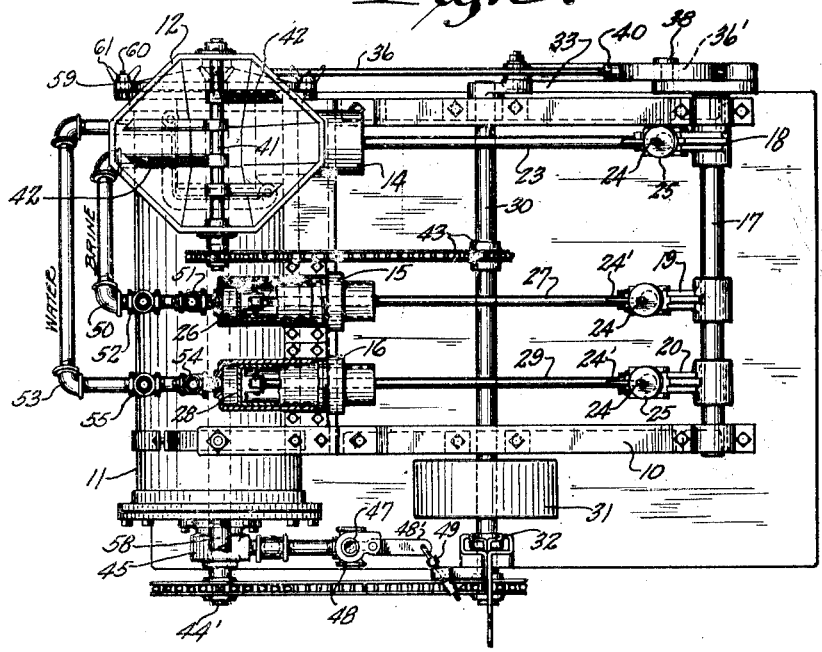
Fig. 3 is a top view of the machine.
Figure 4:
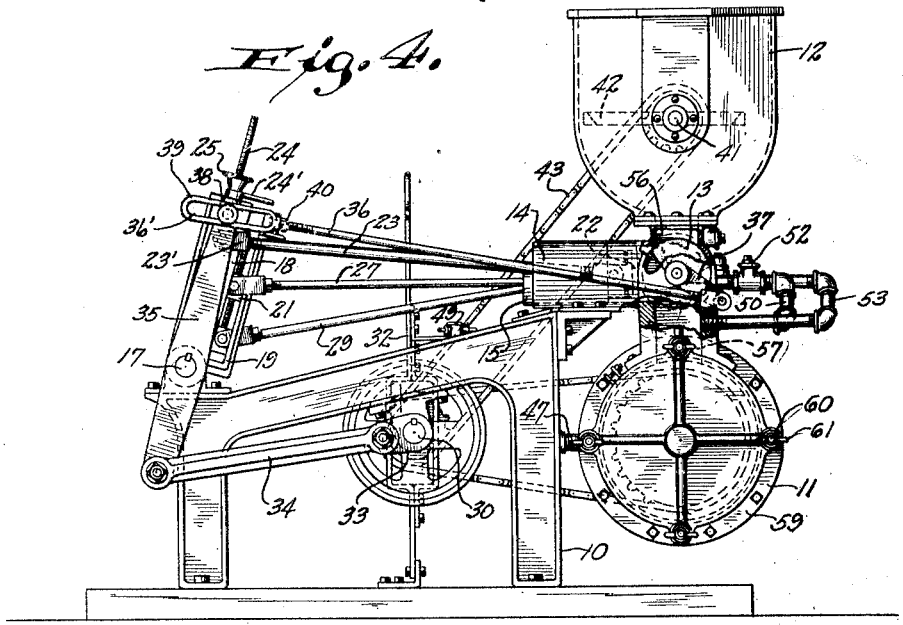
Fig. 4 is a side view opposite to that shown in Fig. 2, a part broken away to show interior construction.
Figure 5:
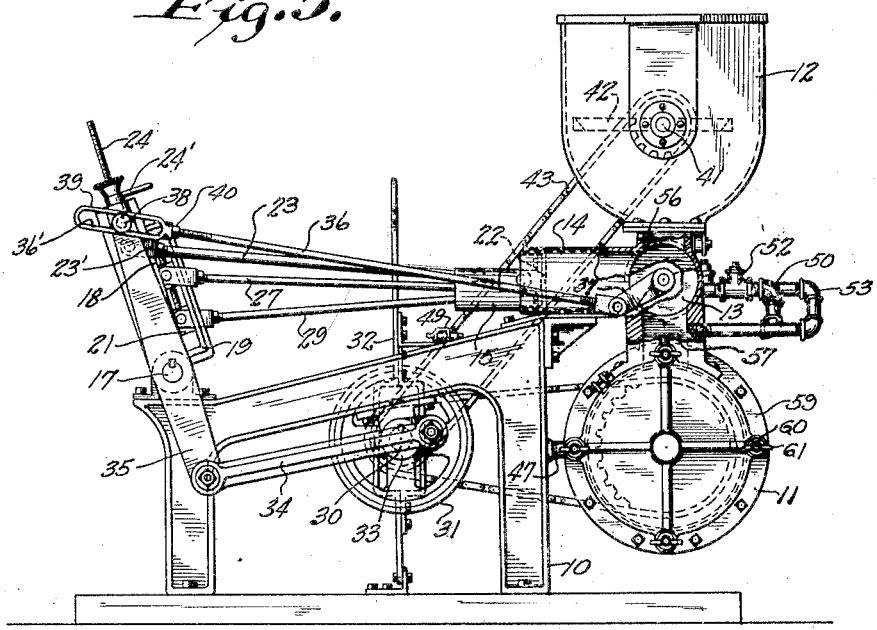
Fig. 5 is a view similar to Fig. 4 with the working parts shown in positions opposite to that shown in Fig. 4.
Figure 6:
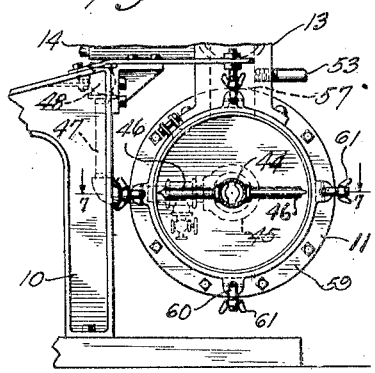
Fig. 6 is a fragmentary side view of the machine, the drum end cover being removed.
Figure 7:
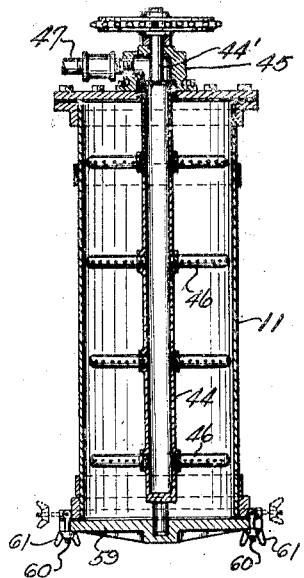
Fig. 7 is a horizontal sectional detail view taken on line 7—7 of Fig. 6.

Referring to the drawings the numeral 10 indicates the frame of the proportional heater, 11 the suspended fixed drum and 12 the feed hopper mounted above the drum. A rocking valve 13 interposed between the feed hopper and the drum forms part of a feed cylinder 14 extending horizontally therefrom. A brine pump 15 and a water pump 16 are also mounted on the frame in parallel relation to the pusher cylinder. A transverse rock shaft 17 journaled in bearings at one end portion of the frame is provided with upwardly extending bearing arms 18, 19 and 20 having vertically adjustable bearing blocks 21. Said arms are rigidly mounted on the rock shaft and rock therewith.

The feed cylinder 14 is provided with a piston or plunger 22 having a pivotal connecting rod 23 which is connected to the bearing block 21 of the arm 18 by means of its end yoke 23'. The yoke 23' straddles the arm and the bearing and is pivotally connected thereto. Each bearing block 21 is connected to the lower end of an adjusting screw 24 and each screw extends through the upper end portion of its respective arm and has a thumb nut 24' threaded thereon to adjust the length of the stroke of the bearing and parts connected thereto. Lock thumb nuts 25 also threaded on the screws clamp the adjusting nuts and the screws in adjusted positions.

The brine cylinder 15 is provided with a piston 26 which is pivotally connected to the bearing block 21 of the arm 19 by a connecting rod 27 in the same manner as described with relation to the connecting rod 25.

The water cylinder 16 is also provided with a piston 28 which is pivotally connected to the arm 20 by a connecting rod 29 in the same manner described with relation to the connecting rods 23 and 27.

A transverse drive shaft 30 journaled below the frame medially of its length is provided on one end portion with a loose driven pulley 31 which is clutched to the shaft 30 by a clutch and control lever 32. The opposite end portion of the shaft 30 has a crank 33 mounted thereon to which is connected one end of a connecting rod 34. The other end of the connecting rod is pivotally connected to the lower end portion of a lever arm 35 which is mounted fast on the transverse shaft 17 and said shaft is rocked thereby. The upper end portion of the lever arm 35 is connected to one end portion of a connecting rod 36, and the other end of said rod is pivotally connected to the crank arm 37. Said crank arm 37 is mounted on the shaft of the rotary valve 13 before mentioned. The connection between the rod 36 and the lever arm 35 is in the form of a bearing block 38 which is pivotally connected to the outer end portion of the lever arm 35. The said bearing block 38 is slidably positioned in the elongated slot 39 of the outer end portion 36' of the connecting rod 36 to permit lost play and to rock the valve 13 with a quick positive movement when the arm 35 is near the end of each oscillation. The connecting rod 36 has a threaded connection 36' with the slotted portion 39 and a nut 40 locks the parts in adjusted position.

A shaft 41 journaled in the hopper 12 is provided with radial blades 42 for stirring the mass of corn or other material so it will be easily discharged through the hopper. The shaft 41 is rotated by a sprocket wheel and chain connection 43 with the transverse drive shaft 30.

The fixed drum 11 is provided with a tubular shaft 44 which has a solid extension 44' projecting through one end of the drum. At the point of junction of the solid extension shaft with the tubular shaft an elbow coupling 45 is mounted on the end of the drum and encloses said parts to supply steam to the tubular shaft 44 which turns in the drum 11. Said tubular shaft is provided with perforated radial extensions 46 which serve to agitate the mass of corn or other material within the drum while injecting steam into the mass. A steam pipe 47 supplies steam to the drum from a source of supply and is controlled by a valve 48. To eliminate the possibility of steam being turned on while the machine is not in operation the operating handle 48' of the valve is connected to the clutch lever 32 by a loose link 49 so that said valve will be turned on or off by the movement of the clutch lever.

The outer end of the brine cylinder 15 has a tube connection 50 with the valve casing of the rock valve 13 just above the drum 11 to supply brine thereto. A tube 51 extends from a source of brine supply, and check valves 52 opening in a direction towards the rock valve 13 prevent the brine from flowing back from the valve 13 or back to the source of brine supply from the pump.

The outer end of the water pump 16 also has a tube connection 53 with the valve casing of the rock valve 13 above the drum 11 and a tube 54 connected to said tube connection 53 extends to a source of water supply. Said tube connections 53 and 54 are also provided with check valves 55 for preventing the return of the water to the source of supply or from the valve casing 13 to the pump 16.

The rock valve 13 is of segmental form and its circumferential length is sufficient to cover the upper inlet and the lower outlet openings or ports 56 and 57 of the rock valve casing, so that on the outer or suction stroke of the feed cylinder piston 22 the rock valve 13 will close the outlet opening 57 and draw the corn or other material into the feed cylinder 14. During the inner or feed stroke of the piston 22 the rock valve 13 uncovers the outlet opening 57 and covers the inlet opening 56 with the result that the corn or other material is forced by the piston from the cylinder through the port or opening 57 and into the drum 11 for sterilization or cooking. A tube 58, connected to the upper portion of the end of the drum to which the steam pipe 47 is connected, provides for the continuous discharge of the corn or other material from said drum by the pressure of the feed piston.

For convenience in gaining access to the interior of the drum for cleaning purposes, the head 59 of the drum is removable and is held in clamped position thereon by threaded swing rods 60 and thumb nuts 61.

From the foregoing description it will be seen that the proportional heater is of very simple construction and is provided with pumps having pistons, the strokes of which may be adjusted by means of the bearing arms to control the proportionate amount of brine and water to be mixed with the corn or other material in passing through the machine. It will also be seen that the corn is subjected to an even cook due to the rotary steam jets being directed into all portions of the corn passing through the drum, and that the feed valve to the tank is operated with quick positive movements.

What I claim as my invention is:

1. A mixture conditioning device, comprising a drum, a hopper, a pump for forcing measured quantities of fluent material received from the hopper into the drum, means for supplying measured quantities of brine and water to the material, and means for supplying steam to the mixture of said brine, water and material.

2. A mixture conditioning device, comprising a drum, a hopper positioned above the drum, a pump for receiving measured quantities of fluent material from the hopper and forcing said material into the drum, means for supplying a liquid in measured quantity to the material, and means for varying the proportions of the mixture of liquid and fluent material passing through said drum.

3. A mixture conditioning device, comprising a drum, a hopper, means for forcing measured quantities of fluent material received from the hopper into the drum, means for supplying measured quantities of brine to the material, means for supplying measured quantities of water to the material, and means for agitating and heating the mixture of said substances in the drum.

4. A mixture conditioning device, comprising a drum, a hopper, a valve interposed between the hopper and the drum and through which material from the hopper passes to the drum, a pump for receiving fluent material from the hopper and for positively forcing said material past said valve into the drum, and means for mixing brine and water in predetermined quantities with the material in said drum.

5. A mixture conditioning device, comprising a drum, a hopper positioned above the drum, a valve interposed between the hopper and the drum for controlling the flow of material from the hopper to the drum, a pump for receiving material from the hopper past said valve and forcing it through the valve and into the drum, and means for injecting steam into the material while it is being agitated in the drum.

6. A mixture conditioning device, comprising a drum, a hopper positioned above the drum, a valve interposed between the hopper and the drum for controlling the flow of material from the hopper to the drum, a pump for receiving material from the hopper past said valve and forcing it through the valve and into the drum, and a rotary member within the drum for agitating the material within the drum radial perforated extensions and for supplying steam thereto.

7. A mixture conditioning device, comprising a fixed drum, a hopper adjacent the drum, a positive displacement fluent material pump interposed between the hopper and the drum and having a valve portion for controlling the flow of material from the hopper to the pump and from the pump to the drum, and means for agitating the material passing through the drum and for injecting steam into said material.

8. A mixture conditioning device, comprising a fixed horizontally extending drum, a hopper, a reciprocal positive displacement pump interposed between the hopper and the drum and having a valved inlet and outlet opening controlling the flow of material from the hopper to the pump and from the pump to the drum, the valve closing the outlet opening during the suction stroke of the piston of the pump and closing the inlet opening during the pressure stroke, means for supplying brine and water to the material measured by said pump, and a rotary member within the drum for agitating the mixed materials and having means for directing steam into the mixture.

9. A mixture conditioning device, comprising a fixed horizontally extending drum, a hopper, a positive displacement pump interposed between the drum and the hopper and having a valved inlet and outlet opening controlling the flow of material from the hopper to the pump and from the pump to the drum, the valve closing the outlet opening during the suction stroke of the piston of the pump and closing the inlet opening during the pressure stroke, a positive displacement pump for supplying measured quantities of brine to the material, a positive displacement pump for supplying measured quantities of water to the material, means for varying the strokes of the pistons of said pumps, and a rotary member within the drum for agitating the measured substances and having means for directing the steam into the mixture.

10. A mixture containing device, comprising a fixed horizontally extending drum, a hopper, a positive displacement pump interposed between the drum and the hopper and having a valved inlet and outlet opening controlling the flow of material from the hopper to the pump and from the pump to the drum, the valve closing the outlet opening during the suction stroke of the piston of the pump and closing the inlet opening during the pressure stroke, a positive displacement pump for supplying brine to the material, a positive displacement pump for supplying measured quantities of water to the material, means for varying the strokes of the pistons of said pumps, a tubular shaft extending into the drum and having perforated radially extending arms for agitating the material, and means for supplying steam to the tubular shaft, and common means for driving said pumps and said shaft.

11. A mixture conditioning device, comprising a fixed horizontally extending drum, a hopper, means for agitating material in the hopper, a pump interposed between the drum and the hopper and having a valved inlet and outlet opening controlling the flow of measured quantities of fluent material from the hopper to the pump and from the pump to the drum, a pump for supplying measured quantities of brine to the material, a pump for supplying measured quantities of water to the material, common means for reciprocating the pistons of said pumps, a tubular shaft extending into the drum and having perforated radially extending arms for agitating the material, means for supplying steam to the tubular shaft, and driving means for said shaft interconnected with said piston reciprocating means.

12. A mixture conditioner, comprising a fixed horizontally extending drum, a hopper, a positive displacement device interposed between the drum and the hopper and having a valved inlet and outlet opening controlling the flow of material from the hopper to the device and from the device to the drum, a positive displacement device for supplying brine to the material a reciprocal pump for supplying water to the material, a tubular shaft extending into the drum and having perforated radially extending arms for agitating the mixture of said substances within said drum, means for supplying steam to the tubular shaft, means controlling the operation of said devices and the tubular shaft, and means for regulating the flow of steam to the tubular shaft.

13. A mixture conditioner, comprising a drum, a hopper, a plunger for withdrawing successive measured batches of material from the hopper and for positively forcing said material through the drum, means for feeding brine and water in predetermined quantities into the path of travel of the material, and means for agitating the material passing through the drum and for injecting a heating medium into the mixture passing through the drum.

14. A mixture conditioner, comprising a drum, a hopper, a plunger for withdrawing successive measured batches of material from the hopper and for positively forcing said material through the drum, means for feeding brine and water in predetermined quantities into the path of travel of the material, means for agitating and for injecting steam into the mixture passing through the drum, and means for independently varying the proportions of the mixture.

15. A mixture conditioner, comprising a drum a hopper, means for receiving material from the hopper and positively forcing successive equal batches thereof through the drum, means for supplying brine and water in predetermined quantities to produce a mixture, and means for agitating and for injecting steam into the mixture passing through the drum.

16. A mixture conditioner, comprising a drum, a hopper, a reciprocating plunger for receiving fluent material from the hopper and positively forcing said material through the drum, a reciprocal plunger for forcing a predetermined quantity of brine into the path of travel of the fluent material, a reciprocal plunger for forcing a predetermined quantity of water into the path of travel of the fluent material, and means for agitating the mixture passing through the drum, and for injecting steam into the material passing through the drum.

17. A mixture conditioner, comprising a drum, a hopper, a single valve interposed between the hopper and the drum and through which material passes from the hopper to the drum, means for operating the valve with a quick positive movement, a pump for receiving measured batches of fluent material from the hopper and for positively forcing said material through the drum, and means for supplying brine and water in predetermined quantities to the fluent material.

18. A mixture conditioner, comprising a fixed drum, a hopper adjacent the drum, a material pump interposed between the hopper and the drum and having a single valve for controlling the flow of fluent material from the hopper to the pump and from the pump to the drum, means for operating the valve with a quick postive movement, and means for agitating the fluent material passing though the drum and for injecting steam into said material.

In testimony whereof I affix my signature.
FRANK D. CHAPMAN.